(12) United States Patent
Kethareswaran et al.

(10) Patent No.: US 7,814,253 B2
(45) Date of Patent: Oct. 12, 2010

(54) RESOURCE ARBITER

(75) Inventors: Harendran Kethareswaran, Trichy (IN); Amit Rao, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 216 days.

(21) Appl. No.: 11/735,511

(22) Filed: Apr. 16, 2007

(65) Prior Publication Data

US 2008/0256279 A1  Oct. 16, 2008

(51) Int. Cl.
*G06F 13/14* (2006.01)
*G06F 13/38* (2006.01)
*G06F 13/36* (2006.01)

(52) U.S. Cl. .................. 710/244; 710/241; 710/116

(58) Field of Classification Search ............. 710/120, 710/244
See application file for complete search history.

(56) References Cited

U.S. PATENT DOCUMENTS

| | | | |
|---|---|---|---|
| 5,303,382 A * | 4/1994 | Buch et al. ................. | 710/244 |
| 5,392,033 A | 2/1995 | Oman et al. | |
| 5,440,752 A | 8/1995 | Lentz et al. | |
| 5,604,865 A | 2/1997 | Lentz et al. | |
| 5,754,800 A | 5/1998 | Lentz et al. | |
| 5,941,979 A | 8/1999 | Lentz et al. | |
| 6,034,542 A | 3/2000 | Ridgeway | |
| 6,098,109 A | 8/2000 | Kotzur et al. | |
| 6,170,032 B1 * | 1/2001 | Izzard ......................... | 710/244 |
| 6,209,053 B1 | 3/2001 | Kurts | |
| 6,219,763 B1 | 4/2001 | Lentz et al. | |
| 6,272,579 B1 | 8/2001 | Lentz et al. | |
| 6,389,480 B1 | 5/2002 | Kotzur et al. | |
| 6,411,236 B1 * | 6/2002 | Kermani .................... | 341/141 |
| 6,493,786 B2 | 12/2002 | Kikinis | |
| 6,611,908 B2 | 8/2003 | Lentz et al. | |
| 6,665,755 B2 | 12/2003 | Modelski et al. | |
| 6,801,978 B2 | 10/2004 | Sota | |
| 6,810,455 B2 * | 10/2004 | Wyland ....................... | 710/113 |
| 6,868,529 B1 * | 3/2005 | Frannhagen ................. | 716/1 |
| 6,892,259 B2 | 5/2005 | Goodrum et al. | |
| 6,934,780 B2 | 8/2005 | Modelski et al. | |
| 6,950,893 B2 | 9/2005 | Chan | |
| 6,981,077 B2 | 12/2005 | Modelski et al. | |
| 7,013,302 B2 | 3/2006 | Modelski et al. | |
| 7,058,742 B2 * | 6/2006 | Kim ........................... | 710/116 |
| 7,133,950 B2 | 11/2006 | Olukotun | |
| 2002/0133654 A1 * | 9/2002 | Yamamoto ................. | 710/116 |
| 2003/0229742 A1 * | 12/2003 | Moss ......................... | 710/111 |
| 2004/0243752 A1 * | 12/2004 | O'Connor et al. .......... | 710/243 |
| 2006/0190649 A1 * | 8/2006 | Ganasan .................... | 710/113 |

\* cited by examiner

*Primary Examiner*—Ryan M Stiglic

(57) ABSTRACT

An aspect of the present invention provides an arbiter which grants a request (to access a resource) in the same clock cycle as in which the requests from requesters is received. In one embodiment, such a feature may be provided in case of arbitration policies requiring state information from previous grants. In another embodiment, such a feature may be provided when the arbitration policy is programmable such that the same arbiter can be used for different arbitration policies.

18 Claims, 4 Drawing Sheets

|  | Req 0 | Req 1 | Req 2 | Req 3 | 231A | 231B | 231C | 231D | 212 | 213 | 214 | 215 | 223 | 378 |
|---|---|---|---|---|---|---|---|---|---|---|---|---|---|---|
| Time Slot 1 | Inactive | Active | Inactive | Inactive | 0 | 1 | 2 | 3 | 0 | 1 | 0 | 0 | 1 | 1 |
| Time Slot 2 | Inactive | Active | Active | Inactive | 0 | 2 | 3 | 1 | 0 | 1 | 0 | 1 | 1 | 2 |
| Time Slot 3 | Active | Inactive | Active | Inactive | 0 | 3 | 1 | 2 | 1 | 0 | 0 | 1 | 0 | 0 |

*FIG. 4*

RESOURCE ARBITER

BACKGROUND

1. Field

The present disclosure relates generally to the field of semiconductor electronics, and more specifically to an arbiter which controls access to resources.

2. Related Art

Arbiters refer to components which control access to a resource by multiple devices. For example, a single unit such as a hard disk may be accessed by multiple devices (requesters) for storage and retrieval of data. Often, the resource (hard disk in the above example) may be able to support simultaneous accesses by only a limited number of requesters at a time.

Therefore, if there are requests for simultaneous access of a resource from more requesters than can be simultaneously accommodated (for example, by granting the request), an arbiter may be used to decide which requests are to be granted.

BRIEF DESCRIPTION OF THE DRAWINGS

The present invention will be described with reference to the following accompanying drawings, which are described briefly below.

FIG. 4 is a table depicting the status/values of respective signal during operation of an arbiter in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

Figure 1:
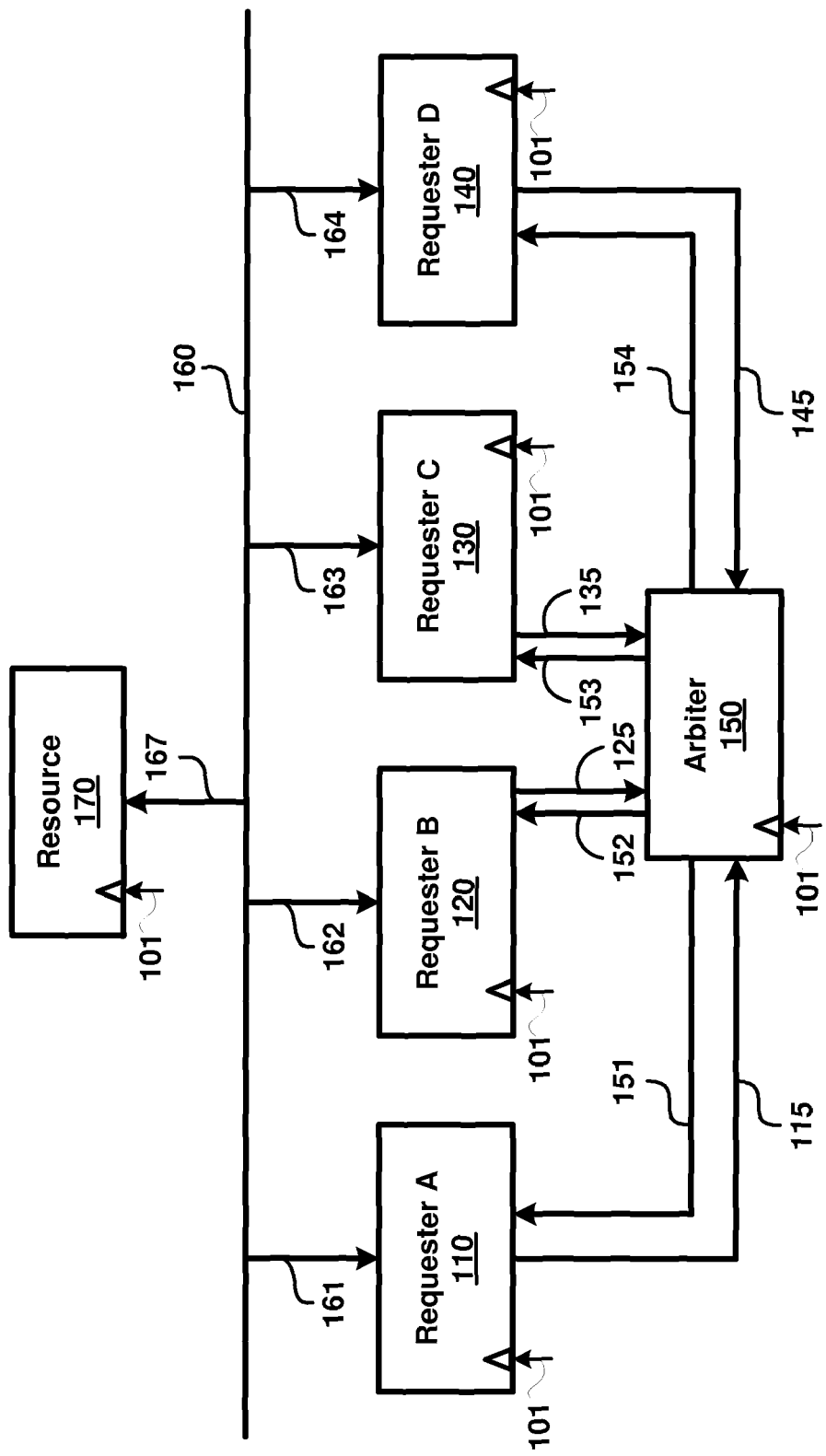
FIG. 1 is a block diagram of an example environment in which several aspects of the present invention may be implemented.

An aspect of the present invention provides an arbiter, which grants a request (to access a resource) in the same clock cycle as in which the requests from requesters is received. In one embodiment, such a feature may be provided in case of arbitration policies (e.g., least recently used, round robin, etc.) requiring state information from previous grants. In another embodiment, such a feature may be provided when the arbitration policy is programmable such that the same arbiter can be used for a desired one of several different arbitration policies.

According to another aspect of the present invention, an arbiter contains input multiplexers, with each input multiplexer selecting one of the grant requests on a corresponding priority path according to a corresponding select value. A fixed priority encoder circuit provides a path identifier of a highest priority path on which a grant request indicating that access to said resource is requested.

Memory elements connected as a shift register in a sequence may also be included, with each memory element storing an identifier and shifting in the identifier stored in a previous memory element in the sequence in response to a clock input signal. An output multiplexer selects one the identifiers stored in the memory elements as a selected identifier according to the path identifier, with the selected identifier identifying the requester to which access is granted. The selected identifier is also provided as an input to a first memory element in the sequence. A policy logic generates the clock input signals based on the path identifier and a desired arbitration policy.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. DEFINITIONS

The following includes definitions of selected terms used throughout the disclosure.

Least Recently Used (LRU) arbitration: When multiple requesters request access to a resource in a same time slot, the requestor who has been granted prior access least recently, is granted access to the resource.

Round-Robin Arbitration: Requesters are granted priority access in turns in a circular fashion.

Fixed priority Arbitration: Each requester is pre-assigned a fixed (different) priority, and the requester with the highest priority is granted access.

Clock Cycle: A single period of a clock signal.

Time slot: Minimum time duration for which access to a resource is granted. Each time slot can contain one or more clock cycles, and can be either a fixed number of clock cycles or varying number, depending on the specific implementation. A resource can potentially be accessed for multiple time slots in sequence, once access is granted.

3. EXAMPLE ENVIRONMENT

FIG. 1 is a block diagram of an example environment in which several features of the present invention may be implemented. The diagram is shown containing resource 170, requesters A (110), B (120), C (130) and D (140), and arbiter 150. All the components may be contained in a single system/device (physical unit). It should be appreciated that one or more features of the present invention can be implemented in various other environments as well without departing from the scope and spirit of several aspects of the invention, as will be apparent to one skilled in the relevant arts by reading the disclosure provided herein. Each component of FIG. 1 is described below in detail.

Resource 170 may correspond to any component/device/system, which can be accessed only by a limited number of requesters in each time slot. For simplicity, it is assumed in the description below that the resource can be accessed only by a single requestor in any given time slot (or clock cycle). However, at least some of the features can be extended to scenarios when multiple requesters can access resource 170 simultaneously. Resource 170 may correspond to components such as a memory (e.g., hard disk), and may be connected to bus 160. Resource 170 may receive and send data on path 167 connected to bus 160. Resource 170 may also receive control commands via path 167.

Requester A (110) is shown connected to bus 160 (via path 161) for sending and receiving data to resource 170.

Requester A(110) may also send/receive control commands via path 161. Requester A (110) sends a request (for access to resource 170) to arbiter 150 (for example, by asserting line 115), and receives a resource grant signal from arbiter 150 via path 151. Requester A (110) may correspond to a module/unit such as a processing unit requiring access to resource 170, and thus may contain (or be connected to) various other subsystems such as RAM, ROM, interface circuits etc, not shown in FIG. 1.

Requesters B (120), C (130) and D (140) may operate in a manner similar to requester A (110), and are shown connected to bus 160 via paths 162, 163 and 164 respectively. Requesters B (120), C (130) and D (140) send resource request signals to arbiter 150 via paths 125, 135 and 145 respectively, and receive resource grant signals via paths 152, 153 and 154 respectively.

Arbiter 150 may receive requests for accessing resource 170 from requesters A, B, C and D, and grants the requests based on a specified arbitration policy, such as LRU (Least Recently Used), fixed priority and round-robin. Resource 170, requesters A (110), B (120), C (130) and D (140), and arbiter 150 may all operate with respect to clock signal on path 101, though different components can operate from different clock signals of same or different source.

Arbiter 150, provided according to various aspects of the present invention, controls access to resource 170. The internal details of arbiter 150 in an embodiment of the present invention is described next.

4. RESOURCE ARBITER

Figure 2:
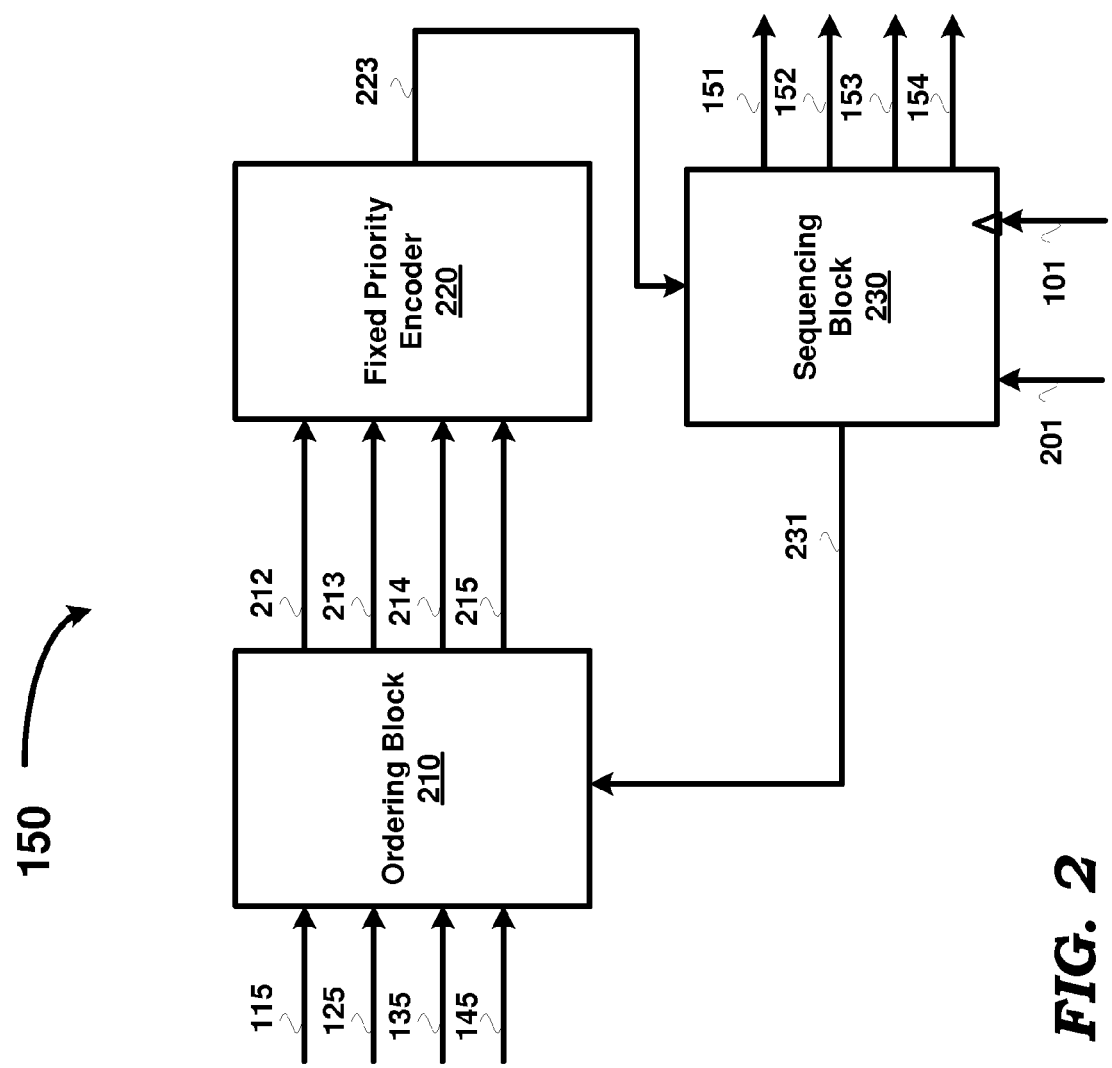
FIG. 2 is a block diagram of a resource arbiter in an embodiment of the present invention.

FIG. 2 is a block diagram of arbiter 150 in an embodiment of the present invention. Arbiter 150 is shown as containing ordering block 210, fixed priority encoder 220 and sequencing block 230. While arbiter 150 in FIG. 2 (and also the figures and description in sections further below) is shown/described as arbitrating four resource grant requests, it must be understood that fewer or more resource requests can also be handled by incorporating fewer/more components and corresponding signal paths/connections. Further, multiple requests can also be received from a same requester. Each component of FIG. 2 is described in detail below.

Ordering block 210 receives four resource grant requests from requesters connected on respective paths 115, 125, 135 and 145 respectively, and receives a 'select' signal on path 231 from sequencing block 230. Depending on the value of the 'select' signal on path 231, ordering block 210 forwards each of requests on paths 115, 125, 135 and 145 on one of paths 212, 213, 214 and 215. Thus, for example, request on path 115 may be forwarded on path 215, request on path 125 forwarded on path 212, request on path 135 may be forwarded on path 214, and request on path 145 forwarded on path 213 based on the value of the select signal. Each of grant request signals on paths 115, 125, 135 and 145 as well as paths 212, 213, 214 and 215 may be provided in the form of, for example, a binary signal wherein one level of the binary signal specifies a request, and the other level specifies no request. In an embodiment, ordering block 210 contains as many (input) multiplexers as grant request signals.

Fixed priority encoder 220 receives resource grant requests forwarded by ordering block 210 on paths 212-215, and provides on output path 223 the path identifier of a highest priority path (among paths 212-215) on which a grant request is received. Fixed priority encoder 220 associates each of paths 212-215 with a corresponding priority level. Thus, as an example, paths 212-215 may have a descending order of priority (212 highest priority, 215 lowest priority). Fixed priority encoder 220 may also associate each path with a corresponding path identifier, which may be in the form of a binary number.

As an example, the path identifiers may be the binary numbers 00 (0 in decimal) through 11(3 in decimal), with 0 corresponding to path 212, 1 corresponding to path 213, 2 corresponding to path 214, and 3 corresponding to path 215. Thus, if a grant request is received simultaneously (or within a same time slot) on all four paths, fixed priority encoder 220 provides the path identifier of path 212 (0 in this example) on path 223. As another example, if in a time slot a grant request is received only on paths 213 and 214, fixed priority encoder 220 provides the path identifier of path 213 (1 in this example) on path 223.

Sequencing block 230 provides a 'select' signal to ordering block 210 based on the value of the path identifier received on path 223 and also the specific arbitration policy sought to be implemented. In an embodiment described below, the arbitration policy is programmable by a user and thus a single arbiter can be used with different arbitration policies. However, alternative embodiments can be implemented, in which arbiter 150 implements a single arbitration policy.

Also, some of the arbitration policies (LRU, round robin, etc.) may require maintaining state information of previous allocations. Accordingly memory elements may also be used to implement a corresponding state machine, as described below with examples.

5. BLOCK DETAILS

Figure 3:
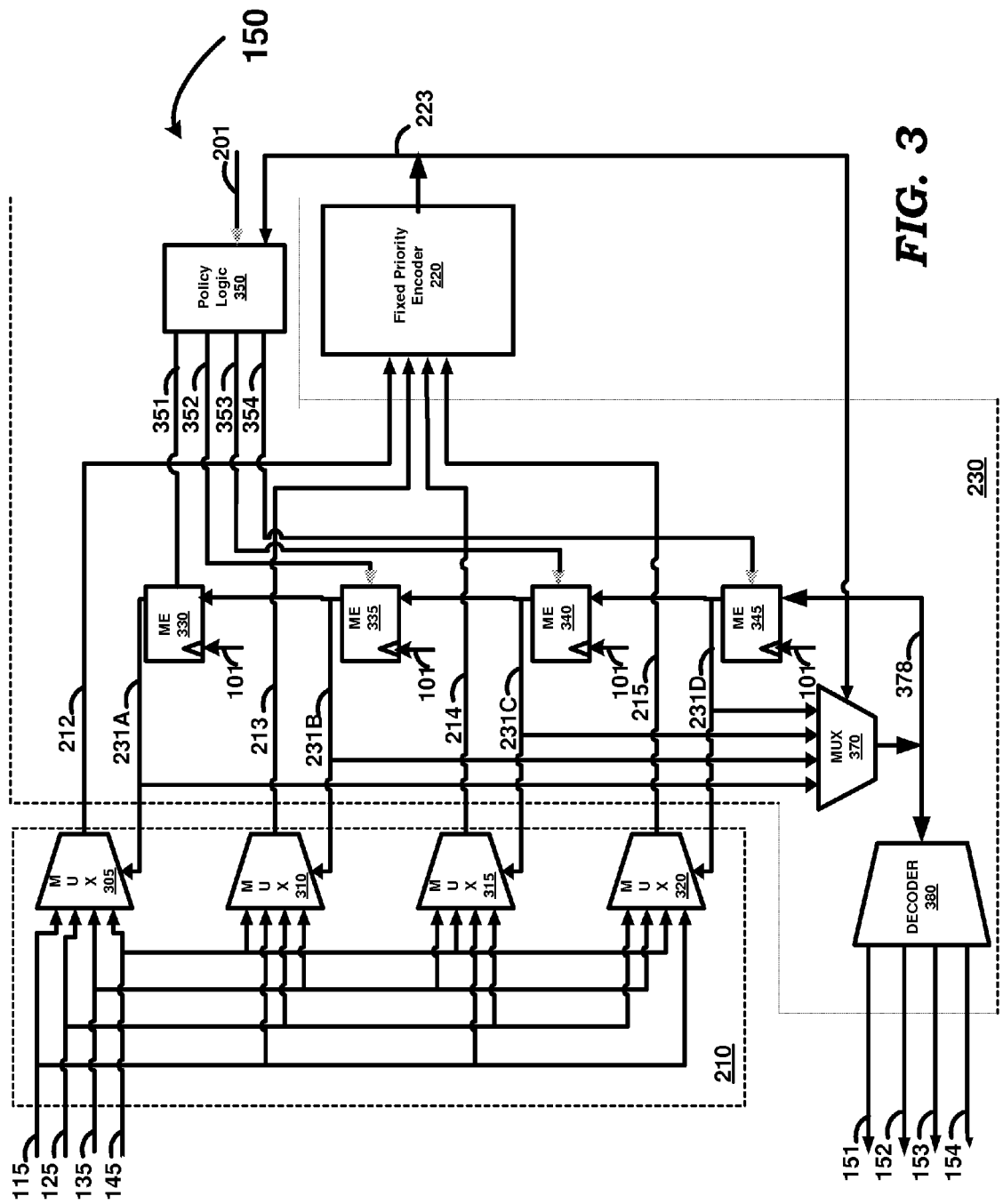
FIG. 3 is a block diagram illustrating the further details of a resource arbiter in an embodiment.

FIG. 3 is a block diagram of the internal details of the components of arbiter 150 in an embodiment.

Fixed priority encoder 220 is assumed in the following description to assign priority to paths 212-215 (and thus requests received on the paths) in a descending order (212 highest, 215 lowest), and may be implemented in a known way.

Ordering block 210 is shown containing (input) multiplexers MUX 305, MUX 310, MUX 315 and MUX 320. As may be seen from FIG. 3, each of the multiplexers receives all of the inputs 115, 125, 135 and 145. MUX 305 provides one of inputs 115, 125, 135 and 145 on path 212 based on a value of select signal 231A. Similarly, each of MUX 310, 315 and 320 provides a different one of inputs 115, 125, 135 and 145 on respective paths 213, 214 and 215 based on respective select signals 231B-231D. Signals 231A-231D are assumed to be contained in 'select' signal 231.

Sequencing block 230 is shown containing memory elements ME 330, ME 335, ME 340 and ME 345, policy logic 350, output MUX 370 and decoder 380. The memory elements are connected in a shift configuration, with each memory element shifting in the value stored in a previous memory element in the shift register chain at each (enabled) clock cycle (e.g. rising/falling edge or high/low level of clock signal 101), except for ME 345 which receives its input on path 378.

Each of memory elements ME 330, ME 335, ME 340 and ME 345 stores an identifier of a requester (one of requesters connected on paths 115, 125, 135 and 145). Although not shown, each of ME 330, 335, 340 and 345 may have a preset input terminal which may be used to initialize the corresponding identifier value stored at initialization time. The initial values may be provided by a user or processor suitably.

For ease of description below, it is assumed that requesters A, B, C and D (of FIG. 1) connected to respective paths 115, 125, 135 and 145 have identifiers 0, 1, 2 and 3 respectively. In the embodiment shown in FIG. 3, each memory element stores a two-bit identifier of a requester.

Each of memory elements provides a stored identifier to a corresponding input multiplexer to select one of grant requests 115, 125, 135 and 145 on a corresponding one of priority paths 212-215. Assuming the priority of paths 212-215 as noted above, input multiplexer MUX 305 may be seen as selecting a grant request on a highest priority path (212). Similarly the other input multiplexers select grant requests on paths with corresponding priorities.

Policy logic 350 receives a path identifier on path 223, and an input specifying a desired arbitration policy on path 201, and provides clock enable signals to each of memory elements ME 330, ME 335, ME 340 and ME 345 on respective paths 351, 352, 353 and 354 to enable/disable clock 101 to the corresponding memory element. Input 201 specifying a desired arbitration policy determines the manner in which the clocks are enabled/disabled.

If the desired policy is round-robin arbitration clocks to each of ME 330, ME 335, ME 340 and ME 345 is enabled always.

If the desired policy is fixed priority arbitration clocks to each of ME 330, ME 335, ME 340 and ME 345 is disabled always.

If the desired policy is LRU (Least Recently Used arbitration), the value of the path identifier received by policy logic 350 on path 223 determines which of multiplexers ME 330, ME 335, ME 340 and ME 345 have their clocks enabled. In an embodiment, policy logic 350 determines enabling/disabling of the clocks in a manner given below:

Path identifier has a value of 0: enable clock to ME 330, ME 335, ME 340 and ME 345.

Path identifier has a value of 1: enable clock only to ME 335, ME 340 and ME 345.

Path identifier has a value of 2: enable clock only to ME 340 and ME 345.

Path identifier has a value of 3: enable clock only to ME 345.

Policy logic 350 may be seen as effectively 'generating' clock input signals to the input multiplexers, even though the physical clock input to the input multiplexers are shown as being provided by a same source (clock 101).

Output multiplexer MUX 370 receives the identifiers output by the memory elements and selects one of the identifiers (selected identifier) on path 378 depending on the path identifier received on path 223 from fixed priority encoder 220. In example illustrated below, MUX 370 selects value on path 231A if path 223 has a value 0, value on path 231B if path 223 has a value 1, value on path 231C if path 223 has a value 2, and value on path 231D if path 223 has a value 3.

Decoder 380 decodes the value of the selected identifier on path 378 and provides a grant signal on one of paths 151-154. Thus, only one of the paths 151-154 (corresponding to the value received on path 378) is asserted to grant access to the respective requestor 110, 120, 130 and 140.

The operation of arbiter 150 in the embodiment described above is illustrated next with examples.

6. OPERATION

FIG. 4 is a table illustrating an example grant request sequence and the corresponding values of signal paths. The table contains three rows corresponding to three successive time slots and each column identifies the value/status of the corresponding signal.

It is assumed that signal 201 has a corresponding value (e.g. binary 00) indicating LRU arbitration is desired, and also that at reset, requests are initialized in decreasing order of priority with path 115 (requester with identifier 0, requester 0 henceforth) having highest priority and path 145 (requester with identifier 3, requester 3 henceforth) having lowest priority.

Row 1 of FIG. 4 contains the entries (signal values) of corresponding signals indicated in the columns at a first time slot (Time slot 1). Row 2 contains the signal values at a second time slot (Time slot 2), and row 3 contains the signal values at a third time slot (Time slot 3).

Since at reset the initial priorities of requesters are assumed to be in decreasing order 0, 1, 2 and 3, the values of signals 231A-231D are shown as 0, 1, 2 and 3 respectively. These initial values may be provided to ME 330, ME 335, ME 340 and ME 345 by a user/processor on a preset terminal (not shown in the figures).

Therefore in allocating resource 170 for time slot 1, signal 231A selects requester 0 (path 115) on path 212, signal 231B selects requester 1 (path 125) on path 213, signal 231C selects requester 2 (path 135) on path 214, and signal 231D selects requester 3 (path 145) on path 215, as indicated by the corresponding entries.

For time slot 1, only requester 1 requests for grant of resource, as indicated by the 'Active' entry under column 'Req 1' along row 'Time slot 1' and 'Inactive' value for the remaining requesters. Thus, only signal 213 is active, as indicated by the entry '1' in the corresponding column.

Fixed priority encoder 220 therefore provides an identifier with value 1 on priority path 223. In response, policy logic 350 enables the clock inputs of ME 335, ME 340 and ME 345, and disables the clock input of ME 330. Output MUX 370 selects the identifier 1 on path 378 since the select enable signal on path 223 is 1. Decoder 380 thus provides an active signal on path 152 signaling a resource grant to requester 1. Requester 1 may then access resource 170, with the access lasting for one or more clock cycles.

It may also be observed that since requester 0 (which had the highest priority in time slot 1) did not request for resource 170 in time slot 1, arbiter 150 grants the resource to requester 1 which has a next highest priority in time slot 1. Thus, there are no "empty" cycles (cycle/time slot in which resource is not granted to any requester even though only request(s) having a current priority less than the highest priority are active in the time slot) between grants due to a requester having a current highest priority not requesting for the resource in the current time slot.

In addition, policy logic 350 enables clock signals only for memory elements 335, 340 and 345 before the next time slot corresponding to row 2 shown in FIG. 4. Accordingly, in a next clock cycle (e.g. at a clock edge or a clock level) ME 335 shifts in the output of ME 340, ME 340 shifts in the output of ME 345, and ME 345 shifts in the output of MUX 370.

Thus, in row 2 corresponding to time slot 2, the values of identifiers (paths 231A-231D) stored in the input multiplexers are 0, 2, 3 and 1 respectively as shown in row 2 in FIG. 4. It may be seen that requester 1 has now been assigned a lowest priority in keeping with the LRU policy.

In allocating resource 170 for time slot 2, signal 231A selects requester 0 (path 115) on path 212, signal 231B selects requester 2 (path 135) on path 213, signal 231C selects requester 3 (path 145) on path 214, and signal 231D selects requester 1 (path 125) on path 215, as indicated by the corresponding entries.

For time slot 2, requesters 1 and 2 request for grant of resource, as indicated by the 'Active' entries under column 'Req 1' and 'Req 2' along row 2. Thus, signals 213 and 215 are active, as indicated by the entries '1' in the corresponding columns.

Fixed priority encoder 220 provides a value of 1 on priority path 223 since path 213 has a higher priority than path 214. Output MUX 370 provides a value of 2 (present on path 231B) on path 378 since the select enable signal on path 223 is 1. Decoder 380 thus provides an active signal on path 153 signaling a resource grant to requester 2. Requester 2 may then access resource 170, with the access lasting for one or more clock cycles.

Again, it may be observed that since requester 0 (which had the highest priority in time slot 2) did not request for resource 170 in time slot 2, arbiter 150 grants the resource to requester 2 which has a next highest priority in time slot 2. It may be seen again that no 'empty' cycles occur between grants due to a requester having a current highest priority not requesting for the resource in the current time slot.

In addition, policy logic 350 enables clock signals only for memory elements 335, 340 and 345 before the next time slot corresponding to row 3 shown in FIG. 4. Accordingly, in a next clock cycle (e.g. at a clock edge or a clock level) ME 335 shifts in the output of ME 340, ME 340 shifts in the output of ME 345, and ME 345 shifts in the output of MUX 370.

Thus, in row 3 corresponding to time slot 3, the values of identifiers (paths 231A-231D) stored in the input multiplexers are 0, 3, 1 and 2 respectively as shown in row 3 in FIG. 4. It may be seen that requester 2 has now been assigned a lowest priority in keeping with the LRU policy.

In allocating resource 170 for time slot 3, signal 231A selects requester 0 (path 115) on path 212, signal 231B selects requester 3 (path 145) on path 213, signal 231C selects requester 1 (path 125) on path 214, and signal 231D selects requester 2 (path 135) on path 215, as indicated by the corresponding entries.

For time slot 3, requesters 0 and 2 request for grant of resource 170, as indicated by the 'Active' entries under column 'Req 0' and 'Req 2' along row 3. Thus, signals 212 and 215 are active, as indicated by the entries '1' in the corresponding columns.

Fixed priority encoder 220 provides a value of 0 on priority path 223 since path 212 has a higher priority than path 214. Output MUX 370 provides a value of 0 (present on path 231A) on path 378 since the select enable signal on path 223 is 0. Decoder 380 thus provides an active signal on path 151 signaling a resource grant to requester 0. Requester 0 may then access resource 170, with the access lasting for one or more clock cycles.

Policy logic 350 enables clock signals for all four memory elements 330, 335, 340 and 345 before the next time slot (not shown). Accordingly, in a next clock cycle (e.g. at a clock edge or a clock level) ME 330 shifts in the output of ME 335, ME 335 shifts in the output of ME 340, ME 340 shifts in the output of ME 345, and ME 345 shifts in the output of MUX 370.

The operation of arbiter 150 of FIG. 3 may be verified for various initial values and combinations of grant requests.

As noted above, if the desired policy is round-robin arbitration clocks to each of ME 330, ME 335, ME 340 and ME 345 is enabled always, while if the desired policy is fixed priority arbitration clocks to each of ME 330, ME 335, ME 340 and ME 345 is disabled always. The operation of arbiter 150 of FIG. 3 may be verified to operate consistently for the case of round robin and fixed priority arbitration in a manner similar to that described above for LRU arbitration.

It may also be appreciated from the illustration above that no empty cycles (clock periods) are introduced if a requester does not request for a grant in a clock period when the arbiter 150 is expecting a request (and ready to grant the request). For example, with respect to the illustrative example of FIG. 4, during Time slot 1 requester 0 has the highest priority and is ready for grant. However, since requester 0 does not request for the resource during Time slot 1, arbiter grants the request to next highest priority requester if active (requester 1 in this case) Thus, time slots are not wasted, and a requester could get its grant immediately if there is no other higher priority request in that time slot.

Grant in a Single Clock Cycle

It may also be observed that arbiter 150 can be designed to grant a request in the same clock cycle (single clock cycle) as the grant is requested. Memory elements ME 330, ME335, ME 340 and 345 in conjunction with fixed priority encoder 220 and policy logic 350 cause corresponding identifiers on paths 231A-231D to be provided before a clock cycle in which decision on allocation needs to be made for next time slot (as may be noted from the description above).

A request signal (paths 115, 125, 135 and 145) asserted at a time instance t0 propagates to fixed priority encoder 220 after a delay 'D1' caused due to propagation delay in the corresponding input multiplexer. Fixed priority encoder 220 may respond with an appropriate value (path 223) after a further delay 'D2'. Output MUX 370 may then select a corresponding one of identifiers on paths 231A through 231D after a further time delay 'D3'. Decoder 380 may provide a grant signal to the appropriate requester after a further time delay 'D4'.

Thus the total time delay between assertion of request and grant of request is 'D1+D2+D3+D4'. Each of delays D1, D2, D3 and D4 may have a very small value since the corresponding components may be implemented using high-speed combinatorial logic. Consequently, the total time delay between assertion of request and grant of request may be very small.

Thus, arbiter 150 (and the operation of the components of FIG. 1) may not be constrained by an operating clock frequency, and clock signal 101 provided to requesters A, B, C and D (FIG. 1) and arbiter 150 may be allowed to have a small clock period (high frequency).

Accordingly, the frequency of a shared clock driving the resource arbiter and any of the requesters and resources, may not be constrained due to the latencies/delays in the arbiter, and the grant may be provided in a single clock cycle.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A resource arbiter for processing requests for access to a resource, said requests being received from a plurality of requesters, said resource arbiter comprising:

an ordering block to receive respective requests from a set of requesters in a first time slot, and selecting each of said respective requests to be present on a corresponding one of a plurality of priority paths based on a value received on a selection path in said first time slot, wherein each of said plurality of priority paths has a corresponding one of a set of priorities, each of said plurality of priority paths having a corresponding one of a plurality of identifiers;

a fixed priority encoder to receive said respective requests on said plurality of priority paths, and to provide an identifier of a highest priority path in said plurality of priority paths on which a grant request indicating that access to said resource is requested is received;

a sequencing block to generate said value on said selection path according to an arbitration policy;

a plurality of memory elements connected as a shift register in a sequence, wherein each memory element stores one of a plurality of identifiers and shifts in the identifier stored in a previous memory element in the sequence in response to a corresponding one of a plurality of clock input signals, said plurality of identifiers respectively identifying said plurality of requesters; and a policy logic generating said plurality of clock input signals based on said path identifier and an arbitration policy.

2. The resource arbiter of claim 1, wherein said arbitration policy is programmable to be any one of a least-recently-used (LRU) policy, a round-robin policy and a fixed priority policy.

3. The resource arbiter of claim 1, wherein said sequencing block updates said value based on said identifier to generate a new value in a next time slot, said new value being consistent with said arbitration policy, said sequencing block generating a resource grant signal in said first time slot based on said value on said selection path.

4. The resource arbiter of claim 3, wherein said plurality of requests are received and said grant signal is generated within a single clock cycle.

5. The resource arbiter of claim 3, wherein said resource is granted in said first time slot to a requester having a priority lower than a highest priority in said first time slot if a requester having a highest priority in said first time slot does not request said resource in said first time slot.

6. A resource arbiter to control access to a resource by a plurality of requesters, said resource arbiter comprising:

a plurality of input multiplexers, wherein each input multiplexer selects one of a plurality of resource grant requests on a corresponding one of a plurality of priority paths according to a corresponding one of a plurality of select values, wherein each grant request indicates whether a corresponding requestor is requesting access to said resource or not, wherein a number of input multiplexers in said plurality of input multiplexers equals a number of requesters in said plurality of requesters;

a fixed priority encoder circuit receiving said plurality of resource grant requests on said plurality of priority paths and providing a path identifier of a highest priority path on which a grant request indicating that access to said resource is requested, is received;

a plurality of memory elements connected as a shift register in a sequence, wherein each memory element stores one of a plurality of identifiers and shifts in the identifier stored in a previous memory element in the sequence in response to a corresponding one of a plurality of clock input signals, said plurality of identifiers respectively identifying said plurality of requesters;

an output multiplexer selecting one of the identifiers stored in said plurality of memory elements as a selected identifier according to said path identifier, wherein said selected identifier identifies the requester to which access is granted, said selected identifier being provided as an input to a first memory element in said sequence; and a policy logic generating said plurality of clock input signals based on said path identifier and an arbitration policy.

7. The resource arbiter of claim 6, wherein each of said plurality of memory elements is set to a different one of said plurality of identifiers at a time of initialization of said resource arbiter.

8. The resource arbiter of claim 7, wherein said arbitration policy is programmable by a user.

9. The resource arbiter of claim 6, wherein said arbitration policy comprises least recently used (LRU) policy, wherein said policy logic enables only the clock input signals corresponding to the memory elements in a first position through a position equaling said path identifier in each time slot.

10. The resource arbiter of claim 6, wherein said arbitration policy comprises a round robin policy, wherein said policy logic enables all of said clock input signals in each time slot.

11. The resource arbiter of claim 6, wherein said arbitration policy comprises a fixed priority policy, wherein said policy logic disables all of said clock input signals in each time slot.

12. A system comprising:

a resource accessible only by a single requestor in each time slot;

a plurality of requesters; and a resource arbiter granting access of said resource to one of said plurality of requesters in each time slot according to an arbitration policy which requires state information as to allocation in at least one prior time slot, wherein said resource arbiter grants said access in a single cycle of a clock signal, wherein at least one of said resource and said resource arbiter also operates at a same frequency as said clock signal;

a plurality of input multiplexers, wherein each input multiplexer selects one of a plurality of resource grant requests on a corresponding one of a plurality of priority paths according to a corresponding one of a plurality of select values, wherein each grant request indicates whether a corresponding requestor is requesting access to said resource or not, wherein a number of input multiplexers in said plurality of input multiplexers equals a number of requesters in said plurality of requesters;

a fixed priority encoder circuit receiving said plurality of resource grant requests on said plurality of priority paths and providing a path identifier of a highest priority path on which a grant request indicating that access to said resource is requested, is received;

a plurality of memory elements connected as a shift register in a sequence, wherein each memory element stores one of a plurality of identifiers and shifts in the identifier stored in a previous memory element in the sequence in response to a corresponding one of a plurality of clock input signals, said plurality of identifiers respectively identifying said plurality of requesters;

an output multiplexer selecting one of the identifiers stored in said plurality of memory elements as a selected identifier according to said path identifier, wherein said selected identifier identifies the requester to which access is granted, said selected identifier being provided as an input to a first memory element in said sequence; and a policy logic generating said plurality of clock input signals based on said path identifier and an arbitration policy.

13. The system of claim 12, wherein said resource arbiter receives grant requests from said plurality of requesters and generates a grant signal to one of said plurality of requesters in said single cycle.

14. The system of claim 12, wherein said arbitration policy is programmable by a user.

15. The system of claim 14, wherein said arbitration policy comprises least recently used (LRU) policy, wherein said policy logic enables only the clock input signals corresponding to the memory elements in a first position through a position equaling said path identifier in each time slot.

16. The system of claim 15, wherein said arbitration policy comprises a round robin policy, wherein said policy logic enables all of said clock input signals in each time slot.

17. The system of claim 16, wherein said arbitration policy comprises a fixed priority policy, wherein said policy logic disables all of said clock input signals in each time slot.

18. The system of claim 12, wherein said resource arbiter grants access to said resource in a time slot to a requester having a priority lower than a highest priority in said time slot if a requester having a highest priority in said first time slot does not request said resource in said time slot.

* * * * *